(12) United States Patent
Dunham et al.

(10) Patent No.: US 7,456,245 B2
(45) Date of Patent: Nov. 25, 2008

(54) ENERGY-ABSORBENT MATERIAL AND METHOD OF MAKING

(75) Inventors: John D. Dunham, Lewis Center, OH (US); Joan T. Muellerleile, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 201 days.

(21) Appl. No.: 10/997,584

(22) Filed: Nov. 24, 2004

(65) Prior Publication Data

US 2006/0111512 A1    May 25, 2006

(51) Int. Cl.
*C08G 77/458* (2006.01)
(52) U.S. Cl. .............................. 528/25; 528/28; 528/44; 528/75; 528/76; 528/80; 528/83; 528/85; 528/58; 428/423.1
(58) Field of Classification Search ........................ None
See application file for complete search history.

(56) References Cited

U.S. PATENT DOCUMENTS

| | | | |
|---|---|---|---|
| 2,001,916 A | 7/1929 | Mazer | |
| 2,036,913 A | 8/1932 | Brown et al. | |
| 3,080,938 A | 4/1961 | Grohmann | |
| 3,132,714 A | 5/1964 | Gary et al. | |
| 3,755,241 A | 8/1973 | Brady | |
| 4,079,162 A | 3/1978 | Metzger | |
| 4,097,633 A | 6/1978 | Focht | |
| 4,101,704 A | 7/1978 | Hiles | |
| 4,248,811 A | 2/1981 | Doyle et al. | |
| 4,346,205 A | 8/1982 | Hiles | |
| 4,367,259 A | 1/1983 | Fulmer et al. | |
| 4,454,253 A | 6/1984 | Murphy et al. | |
| 4,476,258 A | 10/1984 | Hiles | |
| 4,504,604 A | 3/1985 | Pilkington et al. | |
| 4,628,490 A | 12/1986 | Kramer et al. | |
| 4,722,946 A | 2/1988 | Hostettler | |
| 4,777,739 A | 10/1988 | Hiles | |
| 4,980,386 A | 12/1990 | Tiao et al. | |
| 5,114,982 A | 5/1992 | Mendelsohn et al. | |
| 5,218,056 A | 6/1993 | Santiyanont et al. | |
| 5,258,416 A | 11/1993 | Krueger et al. | |
| 5,378,733 A | 1/1995 | Bates et al. | |
| 5,422,380 A | 6/1995 | Mendelsohn et al. | |
| 5,444,668 A | 8/1995 | Sevik | |
| 5,536,910 A | 7/1996 | Harrold et al. | |
| 5,580,651 A | 12/1996 | Kerman | |
| 5,580,917 A | 12/1996 | Maciejewski et al. | |
| 5,600,509 A | 2/1997 | Vacher | |
| 5,688,860 A | 11/1997 | Croft | |
| 5,750,129 A | 5/1998 | Wakarchuk | |
| 5,760,155 A * | 6/1998 | Mowrer et al. ................ 528/28 |
| 5,872,203 A | 2/1999 | Wen et al. | |
| 6,028,122 A | 2/2000 | Everitt et al. | |
| 6,034,148 A | 3/2000 | Kelly et al. | |
| 6,100,363 A | 8/2000 | Sampara et al. | |
| 6,127,443 A | 10/2000 | Perry et al. | |
| 6,133,371 A | 10/2000 | Philipson | |
| 6,147,134 A | 11/2000 | Eling | |
| 6,169,138 B1 | 1/2001 | Petit et al. | |
| 6,380,343 B1 | 4/2002 | Orikabe et al. | |
| 6,407,166 B1 * | 6/2002 | Wang et al. ................... 525/66 |
| 6,590,057 B1 | 7/2003 | Brecht et al. | |
| 6,632,915 B1 | 10/2003 | Schwarte et al. | |
| 6,653,363 B1 | 11/2003 | Tursi et al. | |
| 6,677,424 B2 | 1/2004 | Figge et al. | |
| 6,701,529 B1 | 3/2004 | Rhoades et al. | |
| 2003/0087802 A1 | 5/2003 | Urry | |
| 2003/0096079 A1 | 5/2003 | Messina et al. | |
| 2003/0096884 A1 | 5/2003 | Nishida et al. | |
| 2003/0180500 A1 | 9/2003 | Meyer-Ahrens et al. | |
| 2005/0011710 A1 * | 1/2005 | Hitchcock et al. ........ 188/267.2 |

FOREIGN PATENT DOCUMENTS

| | | |
|---|---|---|
| JP | 04080281 | 3/1992 |
| JP | 06330022 | 11/1994 |

OTHER PUBLICATIONS

PCT International Search Report for PCT/US05/042527.
The Chemistry of Polyurethane Coatings—A General Reference Manual; Mobay Raw Materials for Urethane Coatings; Mobay Corporation; A Bayer USA Inc. Company.
Sorbothane; Sorbothane Solutions . . . Custom Molded to Your Design.
Syntech—Syntactic Foams for Underwater Flotation and Acoustics; http://www.naval-technology.com/contractors/advanced_materials/syntech.
Syntech Materials, Inc.; Syntactic Acoustic Damping Material & Syntactic Acoustic Transduer Baffle; http://www.syntechmaterials.com/acousticmaterials/sadmsatb.html.
Underwater Acoustic Materials; Syntech Materials, Inc.; http://www.syntechmaterials.com/acousticmaterials/.

* cited by examiner

*Primary Examiner*—Mark S Zimmer
(74) *Attorney, Agent, or Firm*—Klaus H. Wiesmann; William B. Richards (57) ABSTRACT

This invention relates to materials which absorb and dissipate energy and/or selectively allow energy to be transmitted, methods of making same, and articles comprising such materials. In particular, polymeric materials which include polyol(s) such as, but not limited to, polyethers, polyesters, polyether/esters, acrylics, and combinations thereof, plus other formulary components such as hydroxyl-terminated polybutadienes, polyisocyanates, silicone, preferably RTV (room temperature vulcanizing) silicone, and, preferably, suitable catalysts, preferably organometallic catalysts such as DBTDL (dibutyl tin dilaurate). Included are such polymeric materials which are resilient and which resist compression and compression set while exhibiting energy absorbing properties. Optionally, additives may be functionally or cosmetically added.

129 Claims, 3 Drawing Sheets

Table 2

| Example | Polyether Polyol Desmophen 1920D (100%) | Polyester Desmodur 670A-80 (%) | Polyol Desmophen 631A-75 (%) | Polyether/ester Polyol Desmophen 1150 (100%) | Acrylic Polyol Joncryl 942 (72%) | Polybutadiene Poly bd R-45M (100%) | Isocyanate Bayhydur 302 (100%) | Silicone RTV 3140 (100%) | Catalyst DBTDL (100%) | Additive Carbon Black | Defoamer | Solvent MEK | Solvent MAK | Thickness Xs (mm) | Reflectance R | Attenuation Coefficient Alpha |
|---|---|---|---|---|---|---|---|---|---|---|---|---|---|---|---|---|
| 1 | 16.00 | 17.82 | | | | 17.82 | 26.31 | 8.91 | 0.09 | 0.05 | | 6.50 | | 4.6 | 0.164 | 0.748 |
| 2 | 11.00 | 17.82 | | | | 17.82 | 26.31 | 8.91 | 0.09 | 0.05 | | 9.00 | | 5.37 | 0.002 | 0.865 |
| 3 | 21.00 | 12.82 | | | | 17.82 | 26.31 | 8.91 | 0.09 | 0.05 | | 6.50 | | 5.34 | 0.000 | 1.097 |
| 4 | 21.00 | 7.82 | | | | 17.82 | 26.40 | 8.91 | 0.30 | 0.05 | | | | 5.48 | 0.012 | 1.800 |
| 5 | 21.00 | 17.82 | | | | 12.82 | 26.40 | 8.91 | 0.30 | 0.05 | | 6.35 | | 5.17 | 0.008 | 0.942 |
| 6 | 21.00 | 17.82 | | | | 7.82 | 26.40 | 8.91 | 0.30 | 0.05 | | 8.85 | | 5.11 | 0.001 | 1.325 |
| 7 | 21.00 | 17.82 | | | | 17.82 | 26.40 | 4.45 | 0.30 | 0.05 | | 6.08 | | 5.29 | 0.001 | 1.444 |
| 8 | 21.00 | 17.82 | | | | 17.82 | 26.40 | 1.00 | 0.30 | 0.05 | | 8.00 | | 5.22 | 0.001 | 0.851 |
| 9 | 21.00 | 17.82 | | | | 17.82 | 21.40 | 8.91 | 0.30 | 0.05 | | 6.35 | | 5.47 | 0.004 | 0.404 |
| 10 | 21.00 | 17.82 | | | | 17.82 | 16.40 | 8.91 | 0.30 | 0.05 | | 8.85 | | 5.19 | 0.004 | 0.426 |
| 11 | 29.67 | 37.19 | | | | 29.67 | 10.00 | 29.66 | 1.00 | | 0.33 | | | 9.7 | 0.775 | 0.330 |
| 12 | 16.70 | 16.70 | | | | 32.78 | 27.50 | 16.70 | 1.00 | 1.20 | | | | 5.48 | 0.011 | 0.229 |
| 13 | | | 24.50 | | | 16.70 | 25.48 | 24.50 | 0.18 | 0.05 | | | 5.00 | 4.26 | 0.002 | 1.286 |
| 14 | | | 18.00 | 18.00 | | 24.50 | 27.00 | 18.00 | 0.50 | 0.50 | | | | 5.67 | 0.011 | 0.356 |
| 15 | | | 18.00 | 22.50 | | 18.00 | 27.00 | 18.00 | 0.50 | 0.50 | | | | 5.48 | 0.005 | 0.610 |
| 16 | | | | | 19.13 | 19.13 | 28.05 | 9.57 | 0.54 | 1.08 | | | | 5.8 | 0.006 | 0.611 |
| 17 | 22.50 | | 19.13 | | | 19.13 | 28.05 | 9.57 | 0.54 | 1.08 | | | | 5.69 | 0.030 | 0.315 |
| 18 | | 19.13 | | 22.50 | | 19.13 | 28.05 | 9.57 | 0.54 | 1.08 | | | | 5.31 | 0.005 | 0.266 |

ENERGY-ABSORBENT MATERIAL AND METHOD OF MAKING

FIELD OF THE INVENTION

This invention relates to materials, particularly polymeric materials, which absorb and dissipate energy and/or selectively allow energy to be transmitted, methods of making same, and articles comprising such materials.

BACKGROUND OF THE INVENTION

Included in the concept of energy absorption are the ability to absorb mechanical vibration, shock, and impulse such as with engine mounts and other shock absorbing devices, as well as absorb acoustical energy. By way of example only, the latter may include conventional sound waves as well as sonar at both sonic and ultrasonic frequencies. Energy absorption can occur in the form of mechanical transmission loss and echo reduction or insertion loss, for example in the field of sonic or ultrasonic sonar. Material is formulated such that the energy from mechanical or acoustic waves is attenuated therein, thereby reducing the energy in the wave as it traverses the material.

Energy-absorbing polymeric materials in general are known in the art. For example, U.S. Pat. No. 4,980,386 to Tiao et al. discloses polyurethane from polyol and polyisocyanate having shock-attenuating and low rebound attributes. U.S. Pat. No. 6,100,363 to Sampara et al. discloses polyurethane-based energy-absorbing elastomers comprising a water scavenger and exhibiting low resilience. U.S. Pat. No. 4,476,258 to Hiles discloses polyurethane elastomer compositions comprising a urethane-forming component and a diisocyanate exhibiting a compression set of less than about five percent and a recovery time of about 10 to about 100 milliseconds. Many materials, including that disclosed in U.S. Pat. No. 4,346,205 to Hiles, are composites which include, for example, hollow glass spheres (U.S. Pat. No. 4,079,162 to Metzger) or, gas bubbles as in a foam (U.S. Pat. No. 4,097,633 to Focht). Finally, perhaps the most well-known damper or isolator material is Sorbothane® from Sorbothane, Inc. of Kent, Ohio. Sorbothane® is a proprietary polyurethane which converts mechanical energy into heat.

Sonar-absorbing materials are also known in the art. U.S. Pat. No. 4,628,490 to Kramer et al. discloses a plurality of non-conducting elastomeric matrix layers having piezoelectric or magnetostrictive particles disposed therein. U.S. Pat. No. 5,444,668 to Sevik discloses an elastomeric matrix containing sealed air-filled cavities and random labyrinths of small water-filled passages. Finally, specialized syntactic foams for underwater acoustic applications (Syntactic Acoustic Damping Material—SADM) are offered by Syntech Materials, Inc. of Springfield, Va. The latter, however, contain lead, a potential environmental hazard.

Despite the wide variety of materials available for various energy-absorbent applications, there remain multiple needs for materials with improved properties which are, at the same time, less burdensome to the environment. For example, acoustic/sonar reduction materials which exhibit high insertion loss per inch, large and tailored echo reduction with relatively thin layers, tailored impedance, and mechanical integrity under deep ocean conditions can provide benefits not available with conventional materials. For mechanical applications, there is a need for materials which exhibit high internal loss and suitable mechanical properties such as hardness and toughness which may be tailored to the application for shock and vibration control.

SUMMARY OF THE INVENTION

A polymeric material is provided with inherently high internal energy loss for mechanical waves propagating through the material. Mechanical waves can be compression or shear waves within the material, variously described in the literature as mechanical waves or, in some contexts, described as acoustic plane waves or higher order acoustic waves. The material formulation is such that mechanical or acoustic waves are attenuated thereby reducing the energy in the wave as it traverses the material in any of several possible waveforms and/or modes of propagation. The energy dissipation within the material is presumed to occur from a variety of internal conditions, including, but not limited to, point relaxation, thermo-elastic effects, interactions between molecules, and interactions between various aspects of polymer chain. These conditions within a material are difficult to measure and to evaluate; therefore, the exact mechanisms are always somewhat speculative in nature and the contribution of each of the various mechanisms to the total energy dissipated. The energy dissipation typically will depend on measurable quantities such as temperature, frequency, and strain amplitude. The energy loss is oftentimes described and measured as hysteresis within the material. A common method to mathematically describe the hysteresis within a material is with the use of complex arithmetic with real and complex portions of the mathematical equation that is a representation of phase differences in the vector components of the physical parameters used to describe the material behavior.

The bulk material performs in a similar manner to dissipate mechanical and/or acoustic energy as gross deflections are imposed on the bulk material as in the case of a machinery mount, shock isolator, vibration isolator mount, noise pad, unconstrained damping material, or as a constrained damping material. The mechanical energy is imposed in a manner to result in tension-compression strain, shear strain, or a combination of tension-compression and shear strain within the bulk material. Similar mechanisms as described above are considered to be the method of energy dissipation.

It has been unexpectedly and surprisingly found that materials comprising a formulation comprising a polyol, preferably a polyol selected from the group consisting of polyether, polyester, polyether/ester, acrylic, and mixtures thereof; a polybutadiene, preferably a hydroxyl-terminated polybutadiene; a polyisocyanate; a silicone; and preferably a suitable catalyst, more preferably an organometallic catalyst, and even more preferably dibutyl tin dilaurate (DBTDL), exhibit improved energy-absorbent properties. Optionally, additives may be functionally (fillers or extenders) or cosmetically (color contributors) added.

It is, therefore, an object of the present invention to provide formulations which form energy-absorbent materials which offer improved acoustic, vibration, and shock attenuating properties over conventional materials. It is also an object of the invention to provide materials whose acoustic impedance matches closely the impedance of water, and especially sea water.

It is further an object of the present invention to provide devices made from or comprising the energy-absorbent materials disclosed herein which offer improved acoustic, vibration, and shock attenuating properties over devices made from conventional materials. Such devices include, without limitation, hydrophone mounts and covers, sub-marine-related coatings and other devices, both passive and active, which operate underwater, composite propellers and thrusters, sonar domes, acoustic panels, sound-reduction mats or blankets, composite hatches and covers, composite fairings and baffles, remote undersea operations vehicles, sound deadening and other sound reduction devices, ear muff components for noise reduction, molded noise-reducing ear plugs, machinery mounts, enclosures, and isolators, and mechanical snubbers, bumpers, stops, impact absorbing structures, vibration and shock reduction materials in sporting equipment and hand tools, and shock absorption in shoes.

It is yet a further object of the present invention to provide methods of preparing such energy-absorbent materials and to further prepare devices made from or comprising such materials.

In one embodiment, an energy-absorbent composition is provided which comprises the result of the combination of a polyol, a polybutadiene, an isocyanate, and a silicone. Preferably, the energy-absorbent composition further comprises a suitable catalyst, more preferably an organotin catalyst, and even more preferably dibutyl tin dilaurate (DBTDL). Preferably, the polyol is chosen from the group consisting of polyether, polyester, polyether/ester, acrylic, and mixtures thereof. For example, the polyether may be Desmophen 1920 D® (Bayer Corp., Pittsburgh, Pa.) polyether. For example, the polyester may be chosen from the group consisting of Desmodur 670A-80® (Bayer) polyester and Desmophen 631A-75® (Bayer) polyester and mixtures thereof. For example, the polyether/ester may be Desmophen 1150® (Bayer) polyether/ester. For example, the acrylic may be Joncryl 492® (Johnson Polymer, Sturtevant, Wis.) acrylic. Preferably, the polybutadiene is a hydroxyl-terminated polybutadiene, for example, Poly bd R-45M® (Startomer, Exton, Pa.). Preferably, the isocyanate is a hexamethylene diisocyanate-based isocyanate, for example, Bayhydur 302® (Bayer) polyisocyanate. Preferably, the silicone is an RTV silicone, for example, RTV 3140® (Dow Corning, Midland, Mich.) silicone rubber. Preferably, the polyol content, on a solvent-free basis, is between ten and 50 weight percent, more preferably between 20 and 45 weight percent, and even more preferably between 25 and 40 weight percent. Preferably, the polybutadiene content, on a solvent-free basis, is less than 50 weight percent, more preferably between ten and 22 weight percent, and even more preferably between 14 and 22 weight percent. Preferably, the isocyanate content, on a solvent-free basis, is between 25 and 60 percent, more preferably between 25 and 45 weight percent, and even more preferably between 28 and 45 weight percent. Preferably, the silicone content, on a solvent-free basis, is between one and 40 weight percent, more preferably between five and 30 weight percent, and even more preferably between ten and 22 weight percent. Preferably, the DBTDL catalyst content, on a solvent-free basis, is between 0.1 and 0.2 weight percent and more preferably between 0.14 and 0.17 weight percent.

In another embodiment, a method of making an energy-absorbent material is provided comprising the steps of combining a polyisocyanate, a polybutadiene, a polyol, a silicone rubber, and, optionally adding a suitable catalyst. Preferably, the polyisocyanate and the polybutadiene are combined, the polyol is mixed therein, and the silicone rubber subsequently mixed therein. A suitable catalyst is preferably added last and mixed therein just prior to casting. The complete mixture may then be introduced into a suitable mold for final curing. Blowing and other preparation procedures may also be employed. In addition, composites, including the inclusion of non-polymeric materials such as solid additives to form a non-homogeneous material, may be formed. Finally, multiple layers of material may be combined to provide additional properties.

Optionally, additives, principally color contributors (prime pigments), may be added. Examples include, carbon black, iron oxide red, black, yellow; lithos red, para red, toluidine red, bon red, hansa yellow, diarylide yellow, benzidine yellow, quinacridone maroon, phthalocyanine blue and green, Chinese blue, and iron blue. Other additives include inert pigments such as calcium carbonate, magnesium carbonate, talcs or aluminum and magnesium silicate, barium sulfate, silicas, mica, and wollastonite (calcium silicate). Finally, additives for, e.g., UV protection, flame retardants, and fillers may be added.

In yet another embodiment, an energy-absorbent material is provided that exhibits improved sound (sonic and ultrasonic) reflectance and attenuation coefficients.

In yet another embodiment, articles comprising the energy-absorbent material disclosed herein are provided. As will be appreciated by one skilled in the art, a virtually unlimited variety of shapes and sizes may be produced, limited only by the materials processing variables.

BRIEF DESCRIPTION OF THE DRAWINGS

FIG. 1 is a table of compositions and test results for several compositions according to the present invention.

DETAILED DESCRIPTION OF THE INVENTION

It has been surprisingly found that a polyol, a polybutadiene, an isocyanate, and a silicone may be combined to produce material with improved energy-absorbent properties Preferred polyols include branched polyethers, branched polyethers having an —OH content of 0.85 percent, branched polyethers having a hydroxyl number between 26 and 30, and branched polyethers having an average equivalent weight of 2,000; linear saturated polyesters, linear saturated polyesters having a hydroxyl number of between 200 and 220, linear saturated polyesters having an —OH content of 6.4 percent, and linear saturated polyesters having an average equivalent weight of 267; polyether/esters having an —OH content of five percent, polyether/esters having a hydroxyl number of 165, and polyether/esters having an average equivalent weight of 340.

Exemplary polyethers include, but are not limited to, Desmophen 1920 D®, a branched, dispersion-grade polyether soluble in esters, ether esters, ketones, and aromatics, but insoluble in aliphatic hydrocarbons. Preferably, between ten and 30 weight percent and more preferably between ten and 25 weight percent.

Exemplary polyesters include, but are not limited to, Desmodur 670A-80® and Desmophen 631A-75®, the latter a saturated polyester resin supplied in propylene glycol monomethyl ether acetate (PMA) soluble in urethane-grade solvents such as ethyl and butyl acetate and in methyl ethyl ketone and methyl isobutyl ketone, but insoluble in aromatic and aliphatic hydrocarbons. Preferably, between five and 35 weight percent, more preferably between ten and 30 weight percent, and even more preferably between 11 and 17 weight percent.

Mixtures of polyether and polyester include, preferably, polyether between 14 and 30 weight percent and polyester between five and 20 weight percent and more preferably polyether between 14 and 25 weight percent and polyester between 11 and 17 percent.

Exemplary polyether/esters include, but are not limited to, Desmophen 1150®, a solvent-free, branched polyol with ether and ester groups soluble in esters, ketones, aromatic hydrocarbons and ether esters, but insoluble in aliphatic hydrocarbons. Preferably, between 15 and 25 weight percent.

Mixtures of polyester and polyether/ester include, preferably, polyester between ten and 20 weight percent and polyether/ester between 15 and 25 weight percent.

Exemplary acrylics include, but are not limited to, Joncryl 942®. Preferably, between ten and 20 weight percent and more preferably between 14 and 16 weight percent.

Preferred polybutadienes include hydroxyl-terminated polybutadienes having a number average molecular weight of 2,800 and hydroxyl-terminated polybutadienes having a hydroxyl functionality of between 2.2 and 2.4.

Exemplary polybutadienes include, but are not limited to, Poly bd R-45M®, a low molecular weight, hydroxyl-terminated homopolymer of butadiene having primary, allylic alcohol groups.

Preferred isocyanates include those based upon hexamethylene diisocyanate (HDI) such as, by way of example only, the biuret of HDI, the isocyanurate ring of HDI, and the copolymer of toluene diisocyanate (TDI) and HDI, isocyanates having an —NCO content of 17 percent, isocyanates having an average equivalent weight of 243, isocyanates comprising an aromatic polyisocyanate, and isocyanates having an —NCO content of between 31 and 33 percent.

Exemplary isocyantes include, but are not limited to, Bayhydur 302®, a solvent-free, water-dispersible polyisocyanate based on hexamethylene diisocyanate (HDI)

Preferred silicones include silicones comprising a polyorganosiloxane silicone and a polyorganosiloxane silicone having a methyltrimethoxysilane proportion of between one and ten percent.

Exemplary silicones include, but are not limited to, RTV 3140®, a one-part, high viscosity, clear, non-corrosive cure, self-leveling, solventless RTV (room temperature vulcanizing) silicone.

In practice, the components of the compositions should be blended and mixed just prior to casting. There are several important factors in the blending of the material. For example, the order of addition can be important. Specifically, adding the materials in the preferred order appears to minimize air entrapment and improve workability prior to casting. For example, the isocyanate, the polybutadiene, and the at least one polyol are preferably blended together as a first step. More preferably, the polybutadiene is first blended with the isocyanate and a first polyol blended into the isocyanate-polybutadiene blend. Preferably, at least one organic solvent is next blended into the isocyanate-polybutadiene-polyol blend. More preferably, the at least one organic solvent comprises a mixture of, first, a solvent suitable for thinning the isocyanate-polybutadiene-polyol blend and, second, a solvent suitable for thinning the silicone. Even more preferably, the first organic solvent comprises cyclohexanone and the second organic solvent comprises xylene. Preferably, the silicone is next blended into the instant mixture. Preferably, an additional portion of organic solvents are added and the entire mixture allowed to become homogeneous. Preferably, and finally, a suitable catalyst is added. Preferably, the suitable catalyst is DBTDL. Other catalysts suitable for catalyzing a reaction between an —OH functionality and an —NCO functionality may be employed. For example, the catalyst may be selected from the group consisting of organometallic, a bismuth-based, a morpholine-based, an amine-based, and mixtures thereof. Upon sufficient blending, the entire mixture may be cast or applied as required.

Mixing must be relatively slow—approximately 250 RPM for prototype tests—to further avoid air entrapment. As will be appreciated by one skilled in the art, the time during which the batch may be allowed to mix subsequent to the addition of any catalyst determines whether the batch sets up prematurely or flows out into a smooth, homogeneous form. For prototype tests, times in the order of a maximum of 30 seconds were expected. While the non-catalyzed components will eventually cure, the inclusion of a suitable catalyst is important to the overall integrity of the cured polymeric matrix as tensile and tear strength, flexibility, and resiliency are affected.

Batch size can also be important. The components in a too-large batch with insufficient mixing may begin to quickly cure before the catalyst is sufficiently disbursed resulting in non-homogeneous material.

While selected compositions are shown herein on a solvent-free basis, it will be recognized by those skilled in the art that many compounds are more practically delivered and worked in a suitable solvent. This is also true during the compounding stage when additional solvents may be added to promote handling and mixing.

Numerous tests were performed on prototype materials. One test procedure involved measuring the sound reflectance and attenuation coefficient. Prototype test panels were subjected to a 1.4 MHz signal through water at ambient temperature and pressure and the reflectance (R) and the transmittance measured. To account for variations in the thickness of the test panels, the attenuation coefficient ($\alpha$) was calculated as follows:

$$\alpha = -\ln(P_{ts}/P_t)/X_s, \text{ where:}$$

$P_{ts}$=received peak-to-peak amplitude of wave propagated through test panel, $P_t$=received peak-to-peak amplitude of wave propagated between transmitter and receiver and Xs=panel thickness.

The reflectance (R) was calculated as follows:

$$R = P_{rs}/P_t, \text{ where:}$$

$P_{rs}$=received peak-to-peak amplitude of wave reflected from sample and $P_t$=received peak-to-peak amplitude of wave propagated between transmitter and receiver.

The prototype test panels were prepared as shown in Table 1, below.

TABLE 1

I. Blend, in order shown, under agitation:
   1. Isocyanate.
   2. Polybutadiene.
   3. Polyol.
   4. A first solvent and optionally, a second solvent.
   5. Optionally, a second polyol.
   6. Silicone.
   7. Optionally, carbon black.
II. Blend, in order shown, under agitation:
   1. A first solvent and optionally, a second solvent.
   2. DBTDL
III. Blend the solvent-DBTDL mixture of Step II into the resultant mixture from Step I for a maximum of 30 seconds.
IV. Pour the resultant mixture from Step III into a suitable mold and allow to cure.

The prototype test panels were prepared using the component formulations as shown in FIG. 1 (Table 2). Component proportions are given in weight percent on a volatiles-included basis. In addition, Table 2 shows the measured reflectance (R) and attenuation coefficient ($\alpha$) for the tested prototype panels.

A second test procedure involved measuring the reflectance loss and insertion loss of a signal varying from 20 kHz to 220 kHz through sea water at five deg. C. and varying pressures from 15 psig to 1800 psig. Measurements of reflection loss (R) and insertion loss (I) were made. Where:

$$I=P_{ts}/P_r$$

The formulation is shown in Table 3, below.

TABLE 3

| Component | Weight Percent |
|---|---|
| Desmophen 1920 D ® (100%) | 20.86 |
| Desmodur 670A-80 ® (80%) | 17.78 |
| Poly bd R-45M ® (100%) | 17.78 |
| Bayhydur 302 ® (100%) | 26.38 |
| RTV 3140 ® (100%) | 8.86 |
| DBTDL | 0.17 |
| Carbon Black | Tr |
| MEK | 4.08 |
| Xylene | 4.09 |

Figure 2:
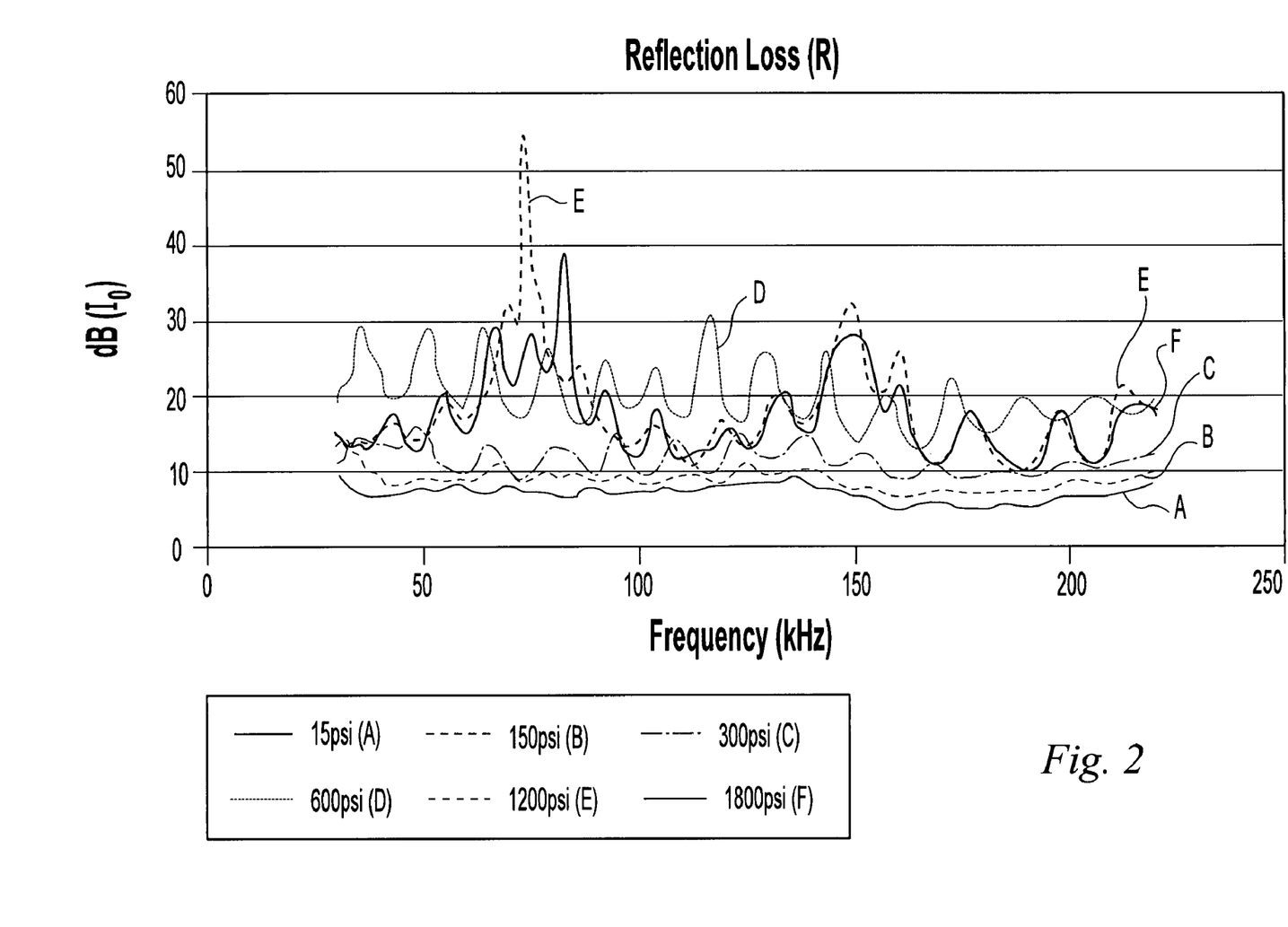
FIG. 2 is a graph showing the reflection loss of material according to the present invention.
Figure 3:
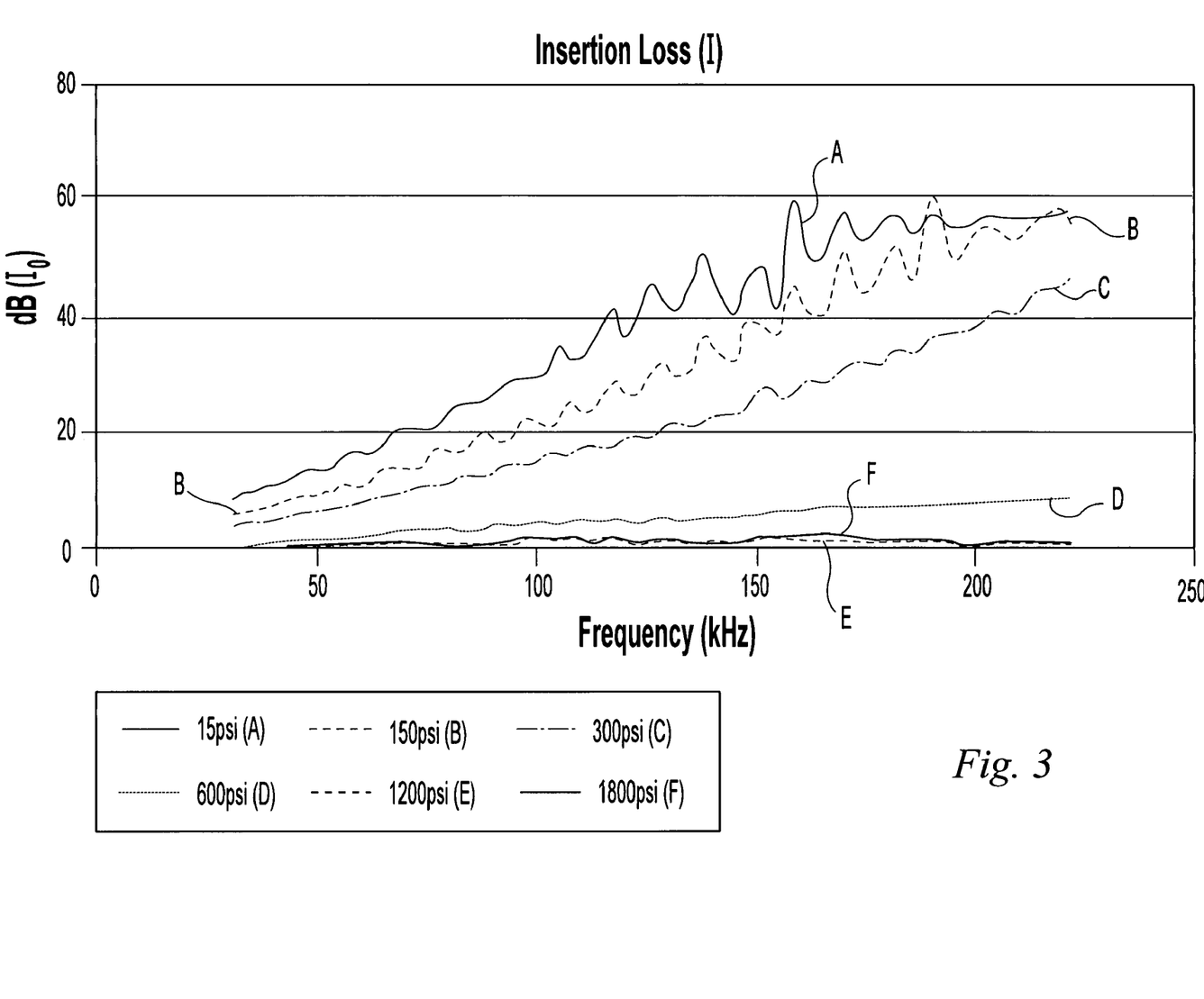
FIG. 3 is a graph showing the insertion loss of material according to the present invention.

Test results for the material resulting from the formulation shown in Table 3 are shown in FIGS. 2 and 3.

Referred to herein are trade names for materials. Applicants do not intend to be limited by materials under a certain trade name. Equivalent materials (e.g., those obtained from a different source under a different name or catalog (reference) number to those referenced by trade name may be substituted and utilized in the compositions herein.

It will be understood that the embodiments of the present invention which have been described herein are illustrative of some of the applications of the principles of the present invention. Various modifications may be made by those skilled in the art without departing from the true spirit and scope of the invention.

What is claimed is:

1. An energy-absorbent composition comprising the result of the curing of a combination of:
    a polyol selected from the group consisting of polyether, polyester, polyether/ester, acrylic, and mixtures thereof;
    a hydroxyl-terminated polybutadiene;
    a polyisocyanate; and
    a curable silicone;
and wherein —NCO functionality is in excess.

2. The energy-absorbent composition of claim 1, further comprising a catalyst.

3. The energy-absorbent composition of claim 2, wherein the catalyst is selected from the group consisting of an organometallic, a bismuth-based, a morpholine-based, an amine-based, and mixtures thereof.

4. The energy-absorbent composition of claim 2, wherein the catalyst comprises an organotin.

5. The energy-absorbent composition of claim 4, wherein the organotin is dibutyl tin dilaurate.

6. The energy-absorbent composition of claim 2, wherein the catalyst is suitable for catalyzing a reaction between an —OH functionality and an —NCO functionality.

7. The energy-absorbent composition of claim 1, wherein the polyol comprises between ten and 50 weight percent.

8. The energy-absorbent composition of claim 7, wherein the polyol comprises between 20 and 45 weight percent.

9. The energy-absorbent composition of claim 8, wherein the polyol comprises between 26 and 40 weight percent.

10. The energy-absorbent composition of claim 1, wherein the hydroxyl-terminated polybutadiene comprises less than 50 weight percent.

11. The energy-absorbent composition of claim 10, wherein the hydroxyl-terminated polybutadiene comprises between ten and 22 weight percent.

12. The energy-absorbent composition of claim 11, wherein the hydroxyl-terminated polybutadiene comprises between 14 and 22 percent.

13. The energy-absorbent composition of claim 1, wherein the polyisocyanate comprises between 25 and 60 weight percent.

14. The energy-absorbent composition of claim 13, wherein the polyisocyanate comprises between 25 and 45 weight percent.

15. The energy-absorbent composition of claim 14, wherein the polyisocyanate comprises between 28 and 45 weight percent.

16. The energy-absorbent composition of claim 1, wherein the polyisocyanate comprises hexamethylene diisocyanate.

17. The energy-absorbent composition of claim 1, wherein the curable silicone comprises between one and 40 weight percent.

18. The energy-absorbent composition of claim 17, wherein the curable silicone comprises between five and 30 weight percent.

19. The energy-absorbent composition of claim 18, wherein the curable silicone comprises between ten and 22 weight percent.

20. The energy-absorbent composition of claim 1, wherein the polyol comprises a polyether and wherein the polyether comprises between ten and 30 weight percent.

21. The energy-absorbent composition of claim 20, wherein the polyether comprises less than 25 weight percent.

22. The energy-absorbent composition of claim 20, wherein the polyether is a branched polyether.

23. The energy-absorbent composition of claim 22, wherein the branched polyether has an —OH content of 0.85 percent.

24. The energy-absorbent composition of claim 22, wherein the branched polyether has a hydroxyl number of between 26 and 30.

25. The energy-absorbent composition of claim 22, wherein the branched polyether has an average equivalent weight of 2,000.

26. The energy-absorbent composition of claim 1, wherein the polyol comprises a polyester and wherein the polyester comprises between five and 35 weight percent.

27. The energy-absorbent composition of claim 26, wherein the polyester comprises between 10 and 30 weight percent.

28. The energy-absorbent composition of claim 27, wherein the polyester comprises between 11 and 17 weight percent.

29. The energy-absorbent composition of claim 1, wherein the polyol comprises a polyether and a polyester, and wherein:
    the polyether comprises between 14 and 30 weight percent; and
    the polyester comprises between five and 20 weight percent.

30. The energy-absorbent composition of claim 29, wherein:
    the polyether comprises less than 25 weight percent; and
    the polyester comprises between 11 and 17 percent.

31. The energy-absorbent composition of claim 1, wherein the polyol comprises a polyether/ester and wherein the polyether/ester comprises between 15 and 25 weight percent.

32. The energy-absorbent composition of claim 1, wherein the polyol comprises a polyester and a polyether/ester, and wherein:
    the polyester comprises between ten and 20 weight percent; and the polyether/ester comprises between 15 and 25 weight percent.

33. The energy-absorbent composition of claim 1, wherein the polyol comprises an acrylic and the acrylic comprises between ten and 20 weight percent.

34. The energy-absorbent composition of claim 1, wherein the acrylic comprises between 14 and 16 percent.

35. The energy-absorbent composition of claim 1, wherein:
the polyol comprises between 25 and 40 weight percent;
the hydroxyl-terminated polybutadiene comprises between 14 and 22 weight percent;
the polyisocyanate comprises between 25 and 45 weight percent; and
the curable silicone comprises between 9 and 22 weight percent.

36. The energy-absorbent composition of claim 35, further comprising a catalyst.

37. The energy-absorbent composition of claim 36, wherein the catalyst comprises dibutyl tin dilaurate between 0.1 and 0.2 weight percent.

38. The energy-absorbent composition of claim 37, wherein the dibutyl tin dilaurate catalyst comprises between 0.14 and 0.17 weight percent.

39. The energy-absorbent composition of claim 35, wherein:
the polyol comprises:
a polyether comprising between 14 and 24 percent; and
a polyester comprising between 11 and 16 percent.

40. The energy-absorbent composition of claim 1, wherein the hydroxyl-terminated polybutadiene has a number average molecular weight of 2,800.

41. The energy-absorbent composition of claim 1, wherein the hydroxyl-terminated polybutadiene has a hydroxyl functionality of between 2.2 and 2.4.

42. The energy-absorbent composition of claim 1, wherein the polyisocyanate has an —NCO content of 17 percent.

43. The energy-absorbent composition of claim 1, wherein the polyisocyanate has an average equivalent weight of 243.

44. The energy-absorbent composition of claim 1, wherein the polyisocyanate comprises an aromatic polyisocyanate.

45. The energy-absorbent composition of claim 44, wherein the polyisocyanate has an —NCO content of between 31 and 33 percent.

46. The energy-absorbent composition of claim 1, wherein the polyol comprises a linear polyester.

47. The energy-absorbent composition of claim 46, wherein the linear polyester is saturated.

48. The energy-absorbent composition of claim 47, wherein the linear saturated polyester has a hydroxyl number of between 200 and 220.

49. The energy-absorbent composition of claim 47, wherein the linear saturated polyester has an —OH content of 6.4 percent.

50. The energy-absorbent composition of claim 47, wherein the linear saturated polyester has an average equivalent weight of 267.

51. The energy-absorbent composition of claim 1, wherein the polyol comprises a polyether/ester having an —OH content of five percent.

52. The energy-absorbent composition of claim 1, wherein the polyol comprises a polyether/ester having a hydroxyl number of 165.

53. The energy-absorbent composition of claim 1, wherein the polyol comprises a polyether/ester having an average equivalent weight of 340.

54. A method of making the energy-absorbent composition of claim 1, comprising:
(a) providing the polyisocyanate;
(b) adding the hydroxyl-terminated polybutadiene to the polyisocyanate;
(c) adding the polyol to the results of step (b);
(d) adding the curable silicone to the results of step (c); and
(e) curing the combination of (a), (b), (c), and(d);
and wherein —NCO functionality is in excess.

55. The method of claim 54, further comprising:
(e) adding a suitable catalyst to the results of step (d).

56. The method of claim 54, wherein:
the polyol is selected from the group consisting of:
a polyether;
a polyester selected from the group consisting of:
a polyester comprising a 75 weight percent solution;
a polyester comprising an 80 weight percent solution; and
mixtures thereof;
a polyether/ester;
an acrylic comprising a 72 weight percent solution; and
mixtures thereof.

57. A method of making the energy-absorbent composition of claim 1, comprising:
blending, in order;
(a) a mixture of the polyisocyanate, the hydroxyl-terminated polybutadiene, and a first polyol;
(b) optionally, an organic solvent;
(c) optionally, a second organic solvent;
(d) optionally, a second polyol
(e) the curable silicone; and
(f) a mixture of, optionally, an organic solvent, optionally, a second organic solvent, and a suitable catalyst; and
curing the resultant mixture;
and wherein —NCO functionality is in excess.

58. An energy-absorbent device made from the method of claim 57.

59. A process for coating an object comprising:
(a) applying the combination of
a polyol selected from the group consisting of polyether, polyester, polyether/ester, acrylic, and mixtures thereof;
a hydroxyl-terminated polybutadiene;
a polyisocyanate; and
a curable silicone to the object; and
(b) curing the combination;
and wherein —NCO functionality is in excess.

60. A process for making an energy-absorbent device comprising:
(a) casting the combination of
a polyol selected from the group consisting of polyether, polyester, polyether/ester, acrylic, and mixtures thereof;
a hydroxyl-terminated polybutadiene;
a polyisocyanate; and
a curable silicone in a suitable mold; and
(b) curing the combination;
and wherein —NCO functionality is in excess.

61. A method of making an energy-absorbent composition comprising:
(a) combining:
a polyol selected from the group consisting of polyether, polyester, polyether/ester, acrylic, and mixtures thereof;

a hydroxyl-terminated polybutadiene;
a polyisocyanate; and
a curable silicone; and
(b) curing the combinations
and wherein —NCO functionality is in excess.

62. The energy-absorbent composition of claim 1, wherein the curable silicone comprises a silicone rubber.

63. The method of claim 54, wherein the curable silicone comprises a silicone rubber.

64. The method of claim 57, wherein the curable silicone comprises a silicone rubber.

65. The process of claim 59, wherein the curable silicone comprises a silicone rubber.

66. The process of claim 60, wherein the curable silicone comprises a silicone rubber.

67. The method of claim 61, wherein the curable silicone comprises a silicone rubber.

68. The energy-absorbent composition of claim 1, wherein the polyol comprises a mixture of a polyether and a polyester.

69. The method of claim 61, wherein the polyol comprises a mixture of a polyether and a polyester.

70. The energy absorbent composition of claim 1, further comprising an additive.

71. The energy absorbent composition of claim 68, further comprising an additive.

72. The energy absorbent composition of claim 70, wherein the additive comprises a color contributor, an inert pigment, a UV protection additive, a flame retardant, or a filler.

73. The energy absorbent composition of claim 71, wherein the additive comprises a color contributor, an inert pigment, a UV protection additive, a flame retardant, or a filler.

74. The process according to claim 59, wherein the process includes a suitable catalyst in the combination.

75. The process according to claim 60, wherein the process includes a suitable catalyst in the combination.

76. The method according to claim 61, wherein the combining step includes a suitable catalyst.

77. The composition according to claim 68, further comprising a suitable catalyst.

78. The method according to claim 69, wherein the combining step includes a suitable catalyst.

79. An energy-absorbent composition comprising the result of the curing of a combination of:
a polyol selected from the group consisting of polyether, polyester, polyether/ester, acrylic, and mixtures thereof;
a hydroxyl-terminated polybutadiene;
a polyisocyanate; and
a curable silicone;
wherein the polyol comprises between 20 and 45 weight percent.

80. The energy-absorbent composition of claim 79, wherein the polyol comprises between 26 and 40 weight percent.

81. The energy-absorbent composition of claim 79, wherein the polyol comprises a polyether and wherein the polyether comprises between ten and 30 weight percent and is a branched polyether.

82. The energy-absorbent composition of claim 81, wherein the branched polyether has an —OH content of 0.85 percent.

83. The energy-absorbent composition of claim 81, wherein the branched polyether has a hydroxyl number of between 26 and 30.

84. The energy-absorbent composition of claim 81, wherein the branched polyether has an average equivalent weight of 2,000.

85. The energy-absorbent composition of claim 79, wherein the polyol comprises a polyester and wherein the polyester comprises between 11 and 17 weight percent.

86. The energy-absorbent composition of claim 79, wherein the polyol comprises a polyether and a polyester, and wherein:
the polyether comprises between 14 and 30 weight percent; and
the polyester comprises between five and 20 weight percent.

87. The energy-absorbent composition of claim 86, wherein:
the polyether comprises less than 25 weight percent; and
the polyester comprises between 11 and 17 percent.

88. The energy-absorbent composition of claim 79, wherein the polyol comprises a polyether/ester and wherein the polyether/ester comprises between 15 and 25 weight percent.

89. The energy-absorbent composition of claim 79, wherein the polyol comprises a polyester and a polyether/ester, and wherein:
the polyester comprises between ten and 20 weight percent; and
the polyether/ester comprises between 15 and 25 weight percent.

90. The energy-absorbent composition of claim 79, wherein the acrylic comprises between 14 and 16 percent.

91. The energy-absorbent composition of claim 79, wherein:
the polyol comprises between 25 and 40 weight percent;
the hydroxyl-terminated polybutadiene comprises between 14 and 22 weight percent;
the polyisocyanate comprises between 25 and 45 weight percent; and
the curable silicone comprises between 9 and 22 weight percent.

92. The energy-absorbent composition of claim 91, further comprising a catalyst.

93. The energy-absorbent composition of claim 92, wherein the catalyst comprises dibutyl tin dilaurate between 0.1 and 0.2 weight percent.

94. The energy-absorbent composition of claim 93, wherein the dibutyl tin dilaurate catalyst comprises between 0.14 and 0.17 weight percent.

95. The energy-absorbent composition of claim 91, wherein:
the polyol comprises:
a polyether comprising between 14 and 24 percent; and
a polyester comprising between 11 and 16 percent.

96. The energy-absorbent composition of claim 79, wherein the hydroxyl-terminated polybutadiene has a number average molecular weight of 2,800.

97. The energy-absorbent composition of claim 79, wherein the hydroxyl-terminated polybutadiene has a hydroxyl functionality of between 2.2 and 2.4.

98. The energy-absorbent composition of claim 79, wherein the polyisocyanate has an —NCO content of 17 percent.

99. The energy-absorbent composition of claim 79, wherein the polyisocyanate has an average equivalent weight of 243.

100. The energy-absorbent composition of claim 79, wherein the polyisocyanate comprises an aromatic polyisocyanate has an —NCO content of between 31 and 33 percent.

101. The energy-absorbent composition of claim 79, wherein the polyol comprises a saturated linear polyester having a hydroxyl number of between 200 and 220.

102. The energy-absorbent composition of claim 79, wherein the polyol comprises a saturated linear polyester having an —OH content of 6.4 percent.

103. The energy-absorbent composition of claim 79, wherein the polyol comprises a saturated linear polyester having an average equivalent weight of 267.

104. The energy-absorbent composition of claim 79, wherein the polyol comprises a polyether/ester having an —OH content of five percent.

105. The energy-absorbent composition of claim 79, wherein the polyol comprises a polyether/ester having a hydroxyl number of 165.

106. The energy-absorbent composition of claim 79, wherein the polyol comprises a polyether/ester having an average equivalent weight of 340.

107. A method of making the energy-absorbent composition of claim 79, comprising:
(a) providing the polyisocyanate;
(b) adding the hydroxyl-terminated polybutadiene to the polyisocyanate;
(c) adding the polyol to the results of step (b);
(d) adding the curable silicone to the results of step (c); and
(e) curing the combination of (a), (b), (c), and (d).

108. The method of claim 107, further comprising:
(e) adding a suitable catalyst to the results of step (d).

109. The method of claim 107, wherein:
the polyol is selected from the group consisting of:
a polyether;
a polyester selected from the group consisting of:
a polyester comprising a 75 weight percent solution;
a polyester comprising an 80 weight percent solution; and
mixtures thereof;
a polyether/ester;
an acrylic comprising a 72 weight percent solution; and
mixtures thereof.

110. A method of making the energy-absorbent composition of claim 79, comprising:
blending, in order;
(a) a mixture of the polyisocyanate, the hydroxyl-terminated polybutadiene, and a first polyol;
(b) optionally, an organic solvent;
(c) optionally, a second organic solvent;
(d) optionally, a second polyol
(e) the curable silicone; and
(f) a mixture of, optionally, an organic solvent, optionally, a second organic solvent, and a suitable catalyst; and
curing the resultant mixture.

111. An energy-absorbent device made from the method of claim 110.

112. A process for coating an object comprising:
(a) applying the combination of
a polyol selected from the group consisting of polyether, polyester, polyether/ester, acrylic, and mixtures thereof;
a hydroxyl-terminated polybutadiene;
a polyisocyanate; and
a curable silicone to the object; and
(b) curing the combination.

113. A process for making an energy-absorbent device comprising:
(a) casting the combination of
a polyol selected from the group consisting of polyether, polyester, polyether/ester, acrylic, and mixtures thereof;
a hydroxyl-terminated polybutadiene;
a polyisocyanate; and
a curable silicone in a suitable mold; and
(b) curing the combination.

114. A method of making an energy-absorbent composition comprising:
(a) combining:
a polyol selected from the group consisting of polyether, polyester, polyether/ester, acrylic, and mixtures thereof;
a hydroxyl-terminated polybutadiene;
a polyisocyanate; and
a curable silicone; and
(b) curing the combination.

115. The energy-absorbent composition of claim 79, wherein the curable silicone comprises a silicone rubber.

116. The method of claim 107, wherein the curable silicone comprises a silicone rubber.

117. The method of claim 110, wherein the curable silicone comprises a silicone rubber.

118. The process of claim 112, wherein the curable silicone comprises a silicone rubber.

119. The process of claim 113, wherein the curable silicone comprises a silicone rubber.

120. The method of claim 114, wherein the curable silicone comprises a silicone rubber.

121. The energy-absorbent composition of claim 79, wherein the polyol comprises a mixture of a polyether and a polyester.

122. The method of claim 114, wherein the polyol comprises a mixture of a polyether and a polyester.

123. The energy absorbent composition of claim 121, further comprising an additive.

124. The energy absorbent composition of claim 123, wherein the additive comprises a color contributor, an inert pigment, a UV protection additive, a flame retardant, or a filler.

125. The process according to claim 112, wherein the process includes a suitable catalyst in the combination.

126. The process according to claim 113, wherein the process includes a suitable catalyst in the combination.

127. The method according to claim 114, wherein the combining step includes a suitable catalyst.

128. The composition according to claim 121, further comprising a suitable catalyst.

129. The method according to claim 122, wherein the combining step includes a suitable catalyst.

* * * * *